Sept. 5, 1950 M. THOMAS Re. 23,266

CARTON

Original Filed Oct. 22, 1947

Inventor
Manville Thomas
By Joseph Rossman
Atty.

Reissued Sept. 5, 1950

Re. 23,266

UNITED STATES PATENT OFFICE 23,266

CARTON

Manville Thomas, Wausau, Wis., assignor to Marathon Corporation, Rothschild, Wis., a corporation of Wisconsin Original No. 2,505,442, dated April 25, 1950, Serial No. 781,260, October 22, 1947. Application for reissue July 7, 1950, Serial No. 172,569

5 Claims. (Cl. 229—33)

Matter enclosed in heavy brackets [ ] appears in the original patent but forms no part of this reissue specification; matter printed in italics indicates the additions made by reissue

This invention relates to a collapsible carton made preferably from a single blank of cardboard and the like. More specifically the invention relates to a carton comprising a tray or receptacle portion provided with means for retaining and rigidifying same in set-up position.

For the purpose of illustrating the invention, there is shown in the accompanying drawings a form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the carton parts as herein shown and described.

Figure 1:
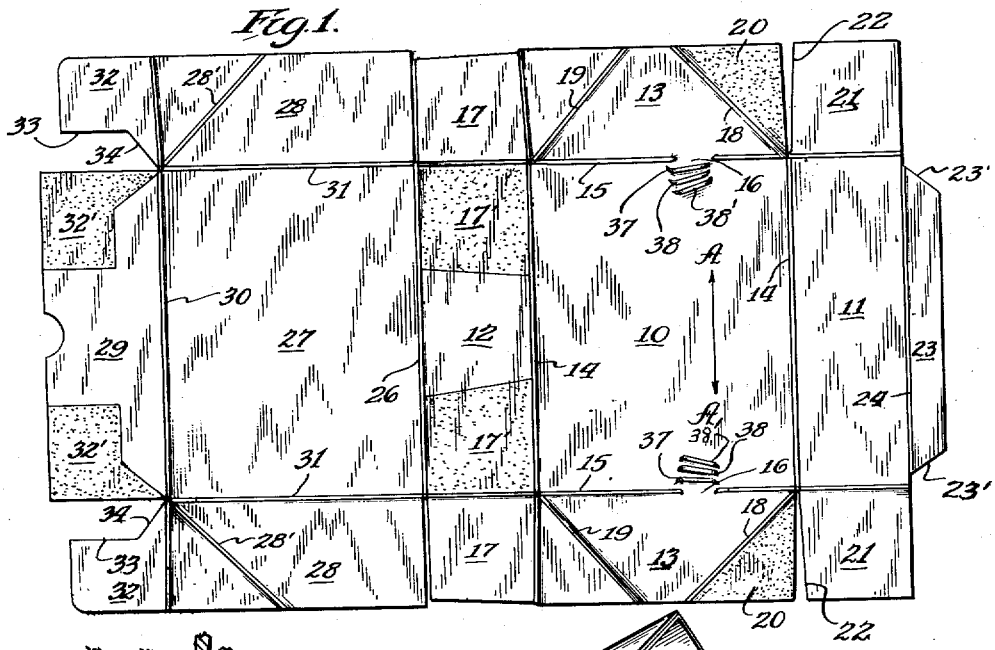
Figure 1 is a plan view of the inside surface of the blank from which the carton is formed.
Figure 4:
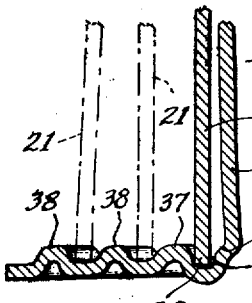
Figure 4 is a vertical section taken along the line 4—4 of Figure 3.

Referring to the drawings, the carton is made from an integral blank of paper, cardboard or the like, suitably cut and scored as illustrated in Figure 1 to provide a foldable tray portion, indicated generally by the numeral 9, comprising a bottom wall 10, a front wall 11, a rear wall 12 and side walls 13 hingedly connected to each other by score lines 14 and 15. The bottom wall is provided with three spaced ridges 37, 38 and 38' at opposite sides for a purpose to be hereinafter explained. It will also be noted that score lines 15 are interrupted for a short length at 16 for a purpose to be explained later. Side walls 13 are provided with integrally hinged flaps 17 which are glued to the rear wall 12 at the areas 17'. The side walls 13 are also provided with diagonal intersecting score lines 18 and 19 to permit collapsing of the tray portion 9 into flat folded position and to provide triangular glue segments 20. The front wall 11 is provided with retaining flaps 21 portions of which are adapted to be overlapped and glued to the triangular glue segments 20 of side walls 13 to constitute the so-called Beers-type flaps. When the tray portion 9 is set up from its flat collapsed position to the position shown in Figure 2, the free portions of flaps 21 will slide over the bottom wall 10 until the lower edge portions 22 are frictionally engaged in the wells 35 which automatically form when the carton is set up as will be explained hereinafter. The tray portion 9 will be retained and rigidified in its fully set up condition for receiving goods to be packaged therein.

Figure 2:
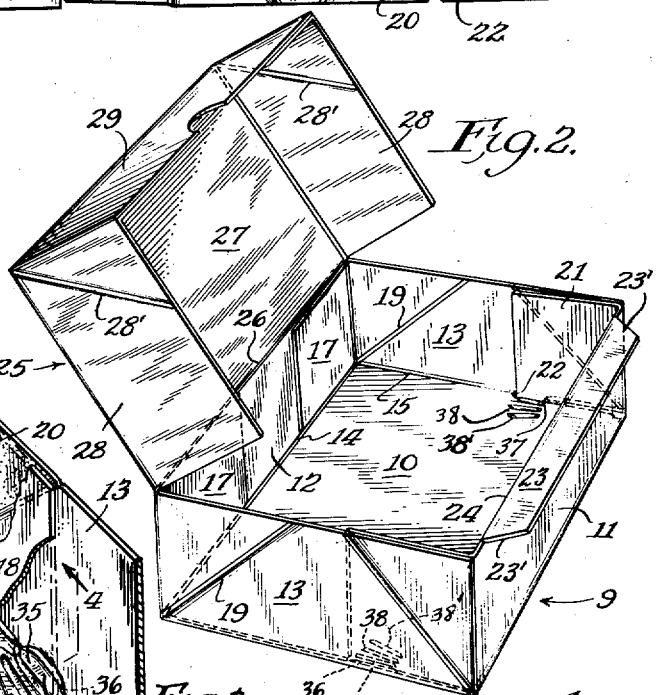
Figure 2 is a perspective view of the set-up carton formed from the blank shown in Figure 1.
Figure 3:
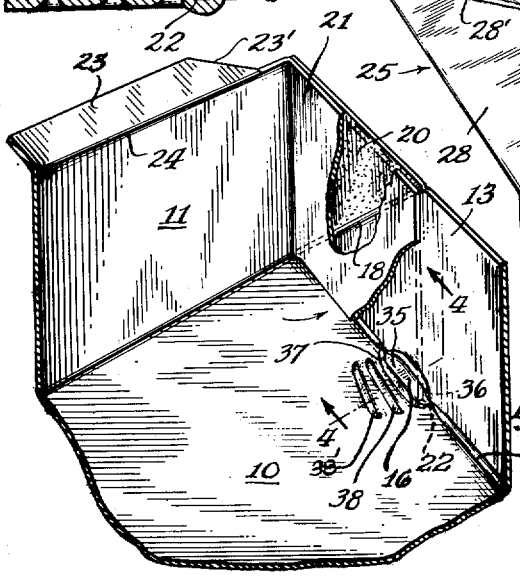
Figure 3 is a fragmental, perspective view illustrating in detail the manner in which the carton is locked and maintained in its upright position.

The front wall 11 of the tray portion 9 is provided at its upper edge with an externally folded locking flap 23 integrally hinged to the front wall, as illustrated in Figures 1, 2 and 3. The flap 23 is preferably hinged to the wall 11 along a score line 24 at the upper edge of the wall 11 so that when the flap 23 is bent back it has a tendency to spring outwardly. The locking flap 23 is cut to provide diagonally disposed edges 23'. The locking flap 23 is adapted to engage and lock with coacting portions on a hinged cover portion, indicated generally by the numeral 25 in Figure 2.

The cover portion 25 which is hinged to the tray portion 9 by a score line 26, comprises a top wall 27, side walls 28 and a front wall 29, hingedly connected by score lines 30 and 31. The side walls 28 are provided with integrally hinged flaps 32 which are adhered to the areas 32' of the front wall 29 of the cover. Also, the side walls 28 are each provided with a diagonal score line 28' which permits collapsing the cover 25 to flat condition. The flaps 32 are recessed or cut along lines 33 and 34 to provide a substantially L-shaped recessed portion which is adapted for receiving and retaining mating portions of the locking flap 23 in snug engagement. The abutment edges 33 and 34 are arranged so as to abut with and engage the adjacent free abutment edge portions 23' of the locking flap 23. When the cover of the set-up carton is placed in closed position, the tendency of the flap 23 to spring outwardly on its hinge line 24 insures positive engagement and locking of the ends 23' of the flap 23 with the recessed portions provided in the front wall 29 of the cover. This construction insures retention and locking of the cover portion when it is placed in the closed position.

When goods are placed in the tray portion 9 of the set-up carton shown in Figure 2 and the cover 25 is closed, a distinct click can be heard when the cover is fully closed as the ends 23' of the locking flap 23 snap into the recessed portions 33, 34 of flaps 32 and thus securely lock together. The cover will not open unless considerable force is applied to it upon which the locking flap 23 will hinge upwardly and thus release its locking function without, however, tearing or rupturing any parts of the carton, as the walls of the carton are sufficiently flexible. The cover 25 can be readily reclosed and locked in closed position as often as may be desired.

The locking construction herein disclosed serves to retain the cover in locked position when the filled with goods cartons are handled. Furthermore, when the filled cartons are to be wrapped in an outer wrapper by automatic machinery the cover will not spring open during the wrapping operations. The carton is thus particularly adapted for making packages which are required to be completely wrapped with an outer protective wrapper as for example in the case of packaging frozen foods and the like.

To assure that the walls of the tray portion 9 are rigidly retained in their fully set-up position preparatory to filling with a commodity and will not collapse or fold back once they are set up, deep depressions or wells 35 (see Figure 3) are automatically formed when the tray portion is set up for cooperative engagement with the bottom edges or extreme tip portions 22 of the retaining flaps 21. As previously stated, the score lines 15, which connect bottom wall 10 with end walls 13, are interrupted or omitted at selected areas 16 for a relatively short length. This is accomplished by eliminating a section of the scoring blade on the usual Miehle press. When the tray portion is squared up or set up, a crease 36 is automatically formed in each side wall 13 which connects the interrupted ends of the score line 15, as shown in Figure 3, and the ends of ridges 37 are connected automatically at the same time with the interrupted ends of score lines 15 by extending creases which form when the carton is set up. The fibers of the carton board also simultaneously tend to pile up so as to raise ridge 37 slightly higher from its previous normal height as well as higher than ridges 38 and 38'. At the same time the area 16 of the carton is depressed below the plane of the bottom wall 10 so as to form a relatively deep well 35 in which the tip portions 22 of the retaining flap 21 slide and are firmly and frictionally engaged. These results are best obtained when the carton is run through the press with the grain or direction of fiber disposition of the carton blank is along the line designated A—A as shown in Figure 1. Embossed ridges 38 and 38' in the bottom wall 10 immediately adjacent each well 16 serve as auxiliary or safety catches to engage the tip portions 22 in event they should accidentally slip out of depressions 35. The embossed ridges 37, 38 and 38' are each disposed at an acute angle with respect to its adjacent score line 15. When the carton is set-up the tip portions 22 of the Beers-style flaps 21 snap into the wells 16 and thus maintain the carton in a substantially rigid, locked condition. In the event a flap 21 disengages itself from a well 35, the auxiliary embossed ridge or ridges 38 and 38' will catch the bottom edge 22 of the flap 21 and prevent further movement of the flap and hence collapse of the carton.

The carton construction described possesses improved characteristics resulting from the retention of the Beers-type flaps within the engaging wells to thereby maintain the tray in rigid, set-up condition in combination with the locking cover for such rigidified, set-up tray.

While the preferred embodiment heretofore described relates to cartons comprising a tray and cover portion integrally hinged thereto, it is understood that the cover portion may be omitted or a separable cover may be used.

The present invention may be embodied in other specific forms without departing from the spirit or essential attributes thereof. It is desired that the present preferred embodiment be considered in all respects as illustrative and not restrictive, reference being had to the appended claims rather than to the aforegoing description to indicate the scope of the invention.

I claim:

1. A collapsible carton formed from an integral blank comprising bottom, front and rear walls, side walls connected to said bottom wall by scored lines interrupted at selected areas, [a glue flap hingedly connected to each side wall and adhered to said rear wall,] a retaining flap hingedly connected to each end of said front wall, diagonally disposed crease lines intersecting each end of said side walls, said crease lines radiating from each corner of said bottom wall and forming triangular segments, portions of said retaining flaps overlapped and adhered to the inner faces of adjacent triangular segments to thereby provide free, unadhered, retaining flap portions, the lower edges of which are slideable over said bottom wall, a ridge formed in said bottom wall adjacent each of said selected areas extending above the plane of the bottom wall and substantially parallel to the side walls and spaced therefrom whereby a well is formed for retaining the lower edges of said free, unadhered, retaining flap portions.

2. A collapsible carton formed from an integral blank comprising bottom, front and rear walls, side walls connected to said bottom wall by scored lines interrupted at selected areas, [a glue flap hingedly connected to each side wall and adhered to said rear wall,] a retaining flap hingedly connected to each end of said front wall, diagonally disposed crease lines intersecting each end of said side walls, said crease lines radiating from each corner of said bottom wall and forming triangular segments, portions of said retaining flaps overlapping and adhered to the inner faces of adjacent triangular segments to thereby provide free, unadhered, retaining flap portions, the lower edges of which are slideable over said bottom wall, a ridge formed in said bottom wall adjacent each of said selected areas and substantially parallel to the side walls and spaced therefrom connecting with said interrupted score lines, and a crease in the side walls connecting said interrupted scored lines adjacent said selected areas whereby a well is formed for retaining the lower edges of said free, unadhered, retaining flap portions.

3. A collapsible carton formed from an integral blank of paper, cardboard or the like comprising bottom, front and rear walls, side walls connected to said bottom wall by scored lines interrupted at selected areas, said scored lines being at right angles with respect to the grain of said blank, [a glue flap hingedly connected to each side wall and adhered to said rear wall,] a retaining flap hingedly connected to each end of said front wall, diagonally disposed crease lines intersecting each end of said side walls and forming triangular segments, portions of said retaining flaps overlapped and adhered to the inner faces of adjacent triangular segments to thereby provide free, unadhered, retaining flap portions, the lower edges of which are slideable over said bottom wall, wells disposed in said bottom wall at said selected areas for retaining the lower edges of said free, unadhered, retaining flap portions, a ridge in said bottom wall adjacent each well and a pair of spaced embossed auxiliary ridges positioned at an acute angle with respect to each side wall spaced from each of said ridges.

4. A collapsible carton formed from an integral blank of paper, cardboard, or the like comprising bottom, front and rear walls, side walls connected to said bottom wall by scored lines interrupted at selected areas, said scored lines being at right angles with respect to the grain of said blank, a glue flap hingedly connected to each side wall and adhered to said rear wall, a retaining flap hingedly connected to each end of said front wall, diagonally disposed crease lines intersecting each end of said side walls, said crease lines radiating from each corner of said bottom wall and forming triangular segments, portions of said retaining flaps overlapped and adhered to the inner faces of adjacent triangular segments to thereby provide free, unadhered, retaining flap portions, the lower edges of which are slideable over said bottom wall, wells disposed in said bottom wall at said selected areas for retaining the lower edges of said free, unadhered, retaining flap portions, a ridge formed in said bottom wall adjacent each well, a crease in each side wall adjacent each well connecting said interrupted score lines and a plurality of parallel, spaced, embossed ridges positioned at an acute angle with respect to each side wall, said embossed ridges being spaced from said formed ridges.

5. An integral blank of paper, cardboard or the like for forming a collapsible carton comprising bottom, front and rear walls, side walls connected to said bottom wall by scored lines interrupted at selected lengths, said scored lines being positioned at right angles with respect to the grain of said blank, a glue flap hingedly connected to each side wall and adhered to said rear wall, a retaining flap hingedly connected to each end of said front wall, diagonally disposed crease lines intersecting each end of said side walls, said crease lines radiating from each corner of said bottom wall and forming triangular segments, portions of said retaining flaps overlapped and adhered to the inner faces of adjacent triangular segments to thereby provide free, unadhered, retaining flap portions, the lower edges of which are slideable over said bottom wall, wells formed automatically in said bottom wall at said selected areas when the carton is set up for retaining the lower edges of said free, unadhered, retaining flap portions, a ridge in said bottom wall adjacent each well connecting with the interrupted ends of the said score line connecting the said bottom and side walls and an embossed ridge positioned at an acute angle with respect to each side wall spaced from each of said first mentioned ridges.

MANVILLE THOMAS.

REFERENCES CITED

The following references are of record in the file of this patent or the original patent:

UNITED STATES PATENTS

| Number | Name | Date |
|---|---|---|
| 1,032,645 | Beers | July 16, 1912 |
| 1,421,526 | Miller | July 4, 1922 |
| 1,437,151 | Riley | Nov. 28, 1922 |
| 1,838,191 | Rumpel | Dec. 29, 1931 |

FOREIGN PATENTS

| Number | Country | Date |
|---|---|---|
| 409,665 | Great Britain | Apr. 30, 1934 |
| 613,214 | France | Mar. 22, 1926 |